Dec. 11, 1928.

G. W. DUNHAM 1,694,810

AUTOMATIC CLUTCH ARRANGEMENT FOR LAUNDRY MACHINES

Original Filed July 28, 1925   2 Sheets-Sheet 1

*INVENTOR.*
George W. Dunham
BY Albert M. Austin
*ATTORNEYS*

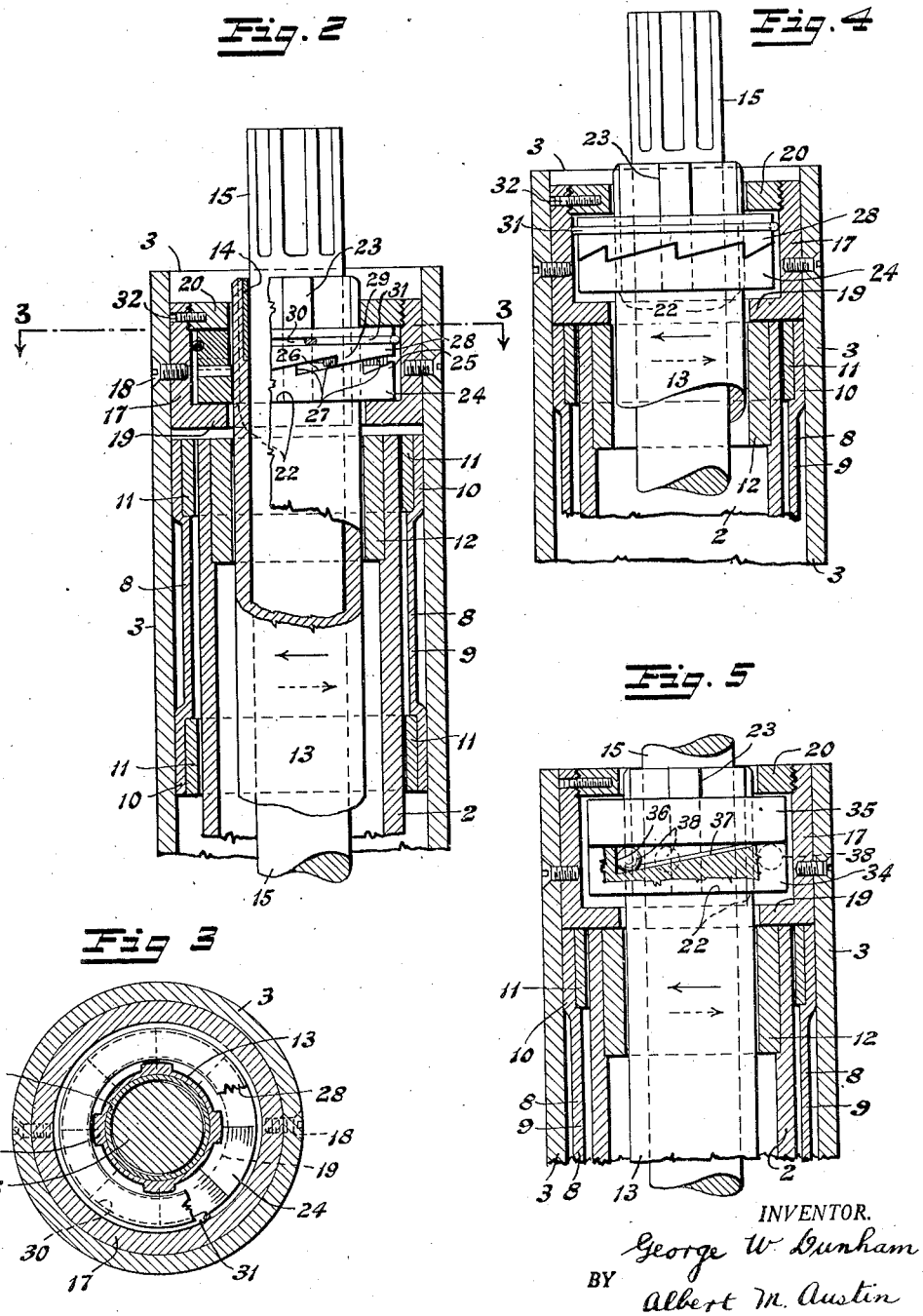

Patented Dec. 11, 1928.

1,694,810

UNITED STATES PATENT OFFICE.

GEORGE W. DUNHAM, OF NEW HAVEN, CONNECTICUT, ASSIGNOR TO WHIRLDRY CORPORATION, OF UTICA, NEW YORK, A CORPORATION OF NEW YORK.

AUTOMATIC CLUTCH ARRANGEMENT FOR LAUNDRY MACHINES.

Application filed July 28, 1925, Serial No. 46,551. Renewed April 20, 1928.

This invention relates to a laundry machine of the type comprising a receptacle which may be stationary for washing and which rotates at a suitable speed for drying. The invention includes an automatic clutch arrangement for operatively connecting the receptacle to its drive shaft, and at the same time transferring the weight of the receptacle from the pedestal which normally carries the weight of the receptacle to the drive shaft. The clutch arrangement is operated simply by rotating the drive shaft in the proper direction to automatically cause the arrangement to function.

According to the invention, the drive shaft may rotate in one direction or may be stationary during the washing operation, but the clutch will not be engaged and the weight of the receptacle will be carried by the pedestal. When it is desired to use the machine for drying purposes the direction of rotation of the drive shaft is reversed in a suitable manner either by reversing the driving motor or by a reversing gear mechanism, this causing the clutch to engage and the receptacle to be raised from the pedestal to the drive shaft. The clutch arrangement may also be used simply for connecting and disconnecting the receptacle to the drive shaft without transferring the load.

Various other objects and advantages of the invention will be obvious from the following particular description of one form of mechanism embodying my invention or from an inspection of the accompanying drawings; and the invention also consists in certain new and novel features of construction and combinations of parts hereinafter set forth and claimed.

In the accompanying drawings I have shown for purposes of illustration one form of mechanism with certain modifications thereof embodying the invention, in which Fig. 1 is a side elevation of a laundry machine to which my invention is applied, parts being in section;

Fig. 2 is a detail of the clutch arrangement showing the receptacle being driven by the drive shaft and its weight supported thereby;

Fig. 3 is a section on the line 3—3 of Fig. 2;

Fig. 4 is a detail section similar to Fig. 2 but showing the position of the clutch elements when the drive shaft is either stationary or rotating in an opposite direction, the weight of the receptacle being carried by the pedestal; and Fig. 5 is a longitudinal section of a modified form of clutch arrangement, the clutch being disengaged and the weight of the receptacle carried by the pedestal.

Figure 1:
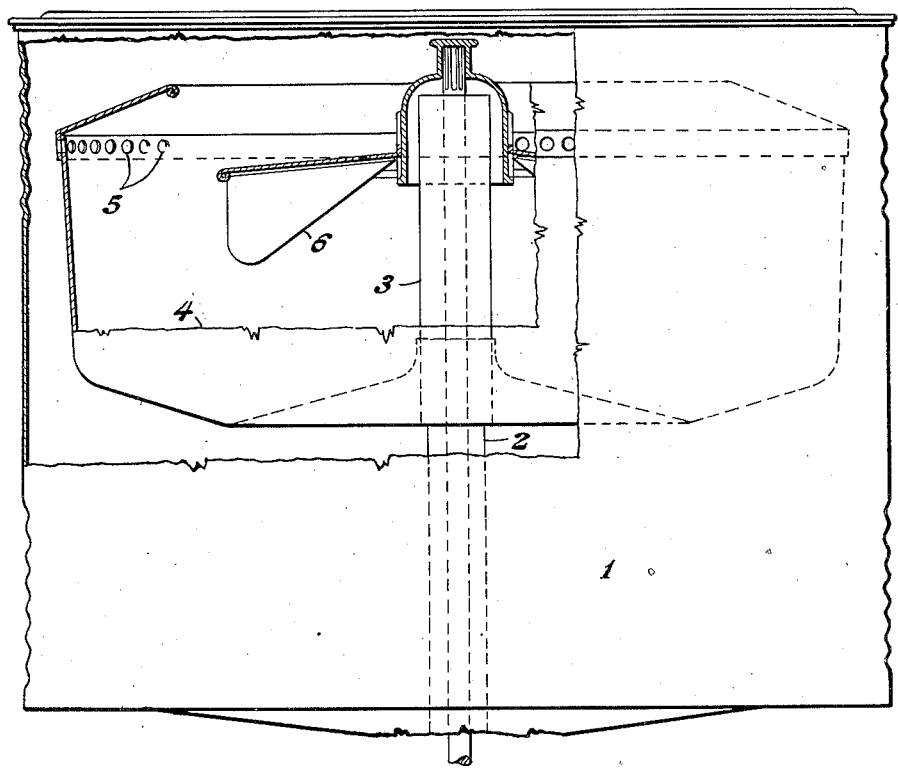

In the following description and in the claims parts will be identified by specific names for convenience, but they are intended to be as generic in their application to similar parts as the art will permit.

Referring now to Figs. 1, 2, 3 and 4, the laundry machine may comprise a tank 1 supported in any suitable manner. Projecting preferably from the bottom of the tank is a hollow pedestal 2 which extends up within the hub 3 of the receptacle 4. The receptacle may be of any desired construction, but for purposes of illustration an imperforate receptacle is shown having outlet openings 5 near its upper edge. Within the receptacle may be located suitable washing mechanism such as an agitator 6. Through the hollow pedestal concentric shafts may be passed. The inner shaft may have operative connection with the washing mechanism, while the tubular outer shaft may have operative connection with the receptacle by means of the improved automatic clutch arrangement according to the invention. These drive shafts may be driven by any suitable mechanism, preferably at the bottom thereof.

The inner surface of the hub 3 near the top thereof is provided with a bearing sleeve denoted generally by 8. The bearing sleeve 8 comprises a tubular body 9 preferably die-cast from zinc alloy. The body 9 is spaced from the hub 3 throughout an intermediate part of its length and is provided with enlarged annular offset portions 10 having preferably a press fit engagement with the hub wall and providing space to hold the bearing rings 11 which are preferably composed of some anti-friction material. The bearing rings 11 project beyond the body 9 and take the wear caused by the radial load imposed upon the pedestal 2 due to the rotation of the receptacle 4.

The pedestal 2 may have an inner bearing sleeve 12 secured thereto to provide a bearing for the outer tubular shaft 13. A bearing sleeve 14 may be provided between the inner shaft 15 and the outer tubular shaft 13 secured preferably to the tubular shaft.

Inside the hub 3 is secured a hub clutch 110 collar 17 by means of machine screws 18 or any other desirable way. The hub clutch collar comprises a lower annular hub disk 19 and an upper annular hub disk 20. When the drive shaft 13 is rotating in the direction shown by the dotted arrow or when it is stationary, the hub clutch collar 17 rests upon the upper edge of the pedestal 2 transmitting the receptacle weight thereto.

At the upper end of the tubular drive shaft 13 a shoulder 22 is provided from which extends longitudinally a plurality of splines 23. Surrounding the tubular shaft 13 is a lower annular shaft disk 24 having grooves therein to accommodate the splines 23 and normally resting against the shoulder 22. The lower shaft disk 24 has on its upper side a series of ratchet teeth 25, each of which has a cam surface 26 and an abutment surface 27. Above the lower shaft disk is an upper shaft disk 28 loosely surrounding the tubular shaft 13 and having, on its lower face, ratchet teeth 29 similar to the ratchet teeth 25 on the lower shaft disk and inter-fitting therewith. The outer surface of the upper shaft disk 28 may be provided with an annular groove 30 in which fits an annular spring 31 which lightly presses against the adjacent face of the hub clutch collar 17.

The upper and lower shaft disks 28 and 24 are positioned between the upper and lower hub disks 20 and 19, the upper hub disk having a screw thread engagement with the body of the hub clutch collar 17 to allow positioning of the upper and lower shaft disks. The upper hub disk 20 may be locked to the body of the hub clutch collar 17 in any suitable manner as by means of a locking screw 32.

It will be seen that when the tubular drive shaft 13 is rotating in the direction indicated by the dotted arrow both the cam surfaces and the abutment surfaces of the teeth on the upper and lower shaft disks will be in engagement and the lower shaft disk being compelled to rotate with the shaft will drive the upper shaft disk. Neither of the shaft disks will engage either of the hub disks, and the receptacle is stationary, its weight being supported by the pedestal. If, however, the shaft 13 is rotated in the direction shown by the solid arrow the cam surfaces on the teeth 25 and 29 will come into play forcing the shaft disks apart, first raising the receptacle off the pedestal and then frictionally gripping the upper and lower hub disks, thereby driving the receptacle through the clutch connection. The annular spring 31 may be omitted if the upper shaft disk has sufficient inertia to cause the teeth on the upper disk to ride up on the teeth on the lower disk when the drive shaft is started rotating in the direction of the continuous arrow.

Referring now to Fig. 5, the hub 3 has a hub clutch collar 17 with upper and lower hub disks 20 and 19 as in Fig. 2. Similarly the upper end of the tubular drive shaft 13 is provided with a shoulder 22 and longitudinal splines 23. A lower shaft disk 34 having grooves into which fit the splines 23 rests normally against shoulder 22. The lower shaft disk 34 has a plurality of recesses 36 in its upper face, the bottom of each recess comprising an inclined groove 37. Each of these recesses accommodates a ball 38. Three recesses are shown but it is obvious that any number may be used. Surrounding the tubular drive shaft is an upper shaft disk 35 having a smooth under surface and normally resting upon the upper surface of the lower shaft disk 34 and lightly touching the balls 38 as they lie at the lowermost points of the recesses.

Normally when the drive shaft is rotating in the direction of the dotted arrow or when it is stationary the balls remain at the lowermost points of the recesses and the clutch arrangement is disconnected, the weight of the receptacle being carried by the pedestal. However, when the shaft is rotating in the direction of the solid arrow the engagement between the upper shaft disk and the balls 38 causes the balls to ride up their inclined grooves 37, thereby forcing the upper and lower shaft disks apart, first raising the receptacle off the pedestal and then tightly engaging the upper and lower hub disks, thereby providing a secure gripping action and causing the receptacle to rotate with the drive shaft and its weight to be carried thereby. In this construction inertia may be depended upon entirely to prevent the upper shaft disk 35 from turning with the lower shaft disk 34 until the balls 38 have forced the shaft disks into engagement with the hub disks.

It is obvious that the automatic clutch constructions according to the invention, are simple, rugged and efficient in operation. The drive shaft may be connected with the receptacle by simply causing the drive shaft to rotate in the proper direction, this same operation also causing the weight of the receptacle to be taken by the drive shaft whence it is transmitted to a bearing (not shown) which can be designed to better carry the vertical load. If the weight of the receptacle is taken by the top of the pedestal while the receptacle is driven at the relatively high speed necessary for drying, a good bearing should be provided between the receptacle and the top of the pedestal which must be kept well lubricated. This arrangement operates satisfactorily but is subjected to the disadvantage that ball bearings are expensive and that the bearing may not be replenished with lubricant after the machine has been in use for a long period of time. Therefore, it is an advantage to provide that the weight of the receptacle during the drying period be taken by a bearing which is cheaper than the ball bearing and which is always well lubricated. Such a bearing is present at the foot of the drying shaft in a gear box at the bottom of the machine.

It is obvious that by omitting the shoulder 22 and allowing the splines to extend downwardly a greater distance these clutch arrangements may be used to function as a simple clutch without the weight shifting features.

While I have shown and described and have pointed out in the annexed claims certain novel features of my invention, it will be understood that various omissions, substitutions and changes in the forms and details of the device illustrated and in its operation may be made by those skilled in the art without departing from the spirit of my invention.

I claim:

1. A laundry machine comprising a receptacle, a support for said receptacle, a drive shaft for said receptacle, and means operative by the direction of rotation of said shaft for transferring the entire weight of said receptacle from said support to said shaft to relieve said support of said weight.

2. A laundry machine comprising a receptacle, a support for said receptacle, a drive shaft for said receptacle, and means operative by the direction of rotation of said shaft for simultaneously transferring the entire weight of said receptacle from said support to said shaft to relieve said support of said weight and for operatively connecting said receptacle to said shaft.

3. A laundry machine comprising a receptacle having a hub, a hollow pedestal for supporting said receptacle and extending within said hub, a drive shaft within said pedestal, and means operative by the direction of rotation of said shaft for transferring the weight of said receptacle from said pedestal to said shaft.

4. A laundry machine comprising a receptacle having a hub, a hollow pedestal for supporting said receptacle and extending within said hub, a drive shaft within said pedestal, and means operative by the direction of rotation of said shaft for simultaneously transferring the weight of said receptacle from said pedestal to said shaft and for operatively connecting said receptacle to said shaft.

5. A laundry machine comprising a receptacle having a hub, a hollow pedestal for supporting said receptacle and extending within said hub, a drive shaft within said pedestal, and means operative by the direction of rotation of said shaft for operatively connecting said receptacle to said shaft.

6. A laundry machine comprising a hollow pedestal, a receptacle hub supported by said pedestal, said hub having a hub clutch element and resting upon said pedestal, a drive shaft within said pedestal, a shaft clutch element, means for causing said clutch elements to engage when said shaft rotates in a proper direction, whereby, said hub is lifted from said pedestal and is driven by said shaft.

7. A laundry machine comprising a hollow pedestal, a receptacle hub supported by said pedestal, said hub having a hub clutch collar with upper and lower hub disks and resting upon said pedestal, a drive shaft within said pedestal, a lower shaft disk, means for constraining said lower shaft disk to rotate with said shaft but allowing relative longitudinal movement, an upper shaft disk loosely mounted on said shaft, means for causing said upper and lower shaft disks to part when said shaft rotates in the proper direction, said shaft disks lying between said hub disks, whereby, said hub is driven by said shaft.

8. A laundry machine comprising a hollow pedestal, a receptacle hub supported by said pedestal, said hub having a hub clutch collar with upper and lower hub disks and resting upon said pedestal, a drive shaft within said pedestal, a lower shaft disk, means for constraining said lower shaft disk to rotate with said shaft but allowing relative longitudinal movement limited downwardly, an upper shaft disk loosely mounted on said shaft, means for causing said upper and lower shaft disks to part when said shaft rotates in the proper direction, said shaft disks lying between said hub disks, whereby, said hub is lifted from said pedestal and is driven by said shaft.

9. A laundry machine comprising a hollow pedestal, a receptacle hub supported by said pedestal, said hub having a hub clutch collar with upper and lower hub disks and resting upon said pedestal, a drive shaft within said pedestal, a lower shaft disk, means for constraining said lower shaft disk to rotate with said shaft but allowing relative longitudinal movement, the upper face of said shaft disk having teeth, each tooth having a cam surface and an abutment surface, an upper shaft disk loosely mounted on said shaft and having teeth on its lower surface similar to said first teeth, said shaft disks lying between said hub disks, whereby, when said shaft rotates in a proper direction said hub is driven by said shaft.

10. A laundry machine comprising a hollow pedestal, a receptacle hub supported by said pedestal, said hub having a hub clutch collar with upper and lower hub disks and resting upon said pedestal, a drive shaft within said pedestal, a lower shaft disk, means for constraining said lower shaft disk to rotate with said shaft but allowing relative longitudinal movement limited downwardly, the upper face of said shaft disk having teeth, each tooth having a cam surface and an abutment surface, an upper shaft disk loosely mounted on said shaft and having teeth on its lower surface similar to said first teeth, said shaft disks lying between said hub disks, whereby, when said shaft rotates in a proper direction said hub is lifted from said pedestal and is driven by said shaft.

11. A laundry machine comprising a hollow pedestal, a receptacle hub supported by said pedestal, said hub having a hub clutch collar with upper and lower hub disks, said lower hub disk resting upon said pedestal, a drive shaft within said pedestal and having a shoulder at its upper end with longitudinal splines extending upwardly therefrom, a lower shaft disk having grooves for said splines and resting against said shoulder, the upper face of said shaft disk having teeth, each tooth having a cam surface and an abutment surface, an upper shaft disk loosely mounted on said shaft and having teeth on its lower surface similar to said first teeth, said shaft disks lying between said hub disks, said upper shaft disk having an annular groove in its side, an annular spring fitting in said groove and lightly bearing again said collar, whereby, when said shaft rotates in one direction said hub is not moved and when it is rotated in an opposite direction said hub is lifted from said pedestal and is driven by said shaft.

In testimony whereof I have hereunto set my hand.

GEORGE W. DUNHAM.